US006694637B2

(12) United States Patent
Miller, Jr. et al.

(10) Patent No.: US 6,694,637 B2
(45) Date of Patent: Feb. 24, 2004

(54) FLUX COLLECTION METHOD AND SYSTEM

(75) Inventors: Richard W. Miller, Jr., Sunrise Beach, MO (US); Jonathan M. Dautenhahn, Linn Creek, MO (US); Marc C. Apell, Camdenton, MO (US)

(73) Assignee: Speedline Technologies, Inc., Franklin, MA (US)

( * ) Notice: Subject to any disclaimer, the term of this patent is extended or adjusted under 35 U.S.C. 154(b) by 17 days.

(21) Appl. No.: 10/051,408

(22) Filed: Jan. 18, 2002

(65) Prior Publication Data

US 2003/0136020 A1 Jul. 24, 2003

(51) Int. Cl.$^7$ ............................................. F26B 21/06
(52) U.S. Cl. ............................. 34/82; 34/332; 34/392; 34/79; 34/85
(58) Field of Search ..................... 34/391, 392, 332, 34/62, 79, 82, 85

(56) References Cited

U.S. PATENT DOCUMENTS

| | | | | |
|---|---|---|---|---|
| 4,557,203 A | * | 12/1985 | Mainord | 110/344 |
| 5,524,812 A | | 6/1996 | Taniguchi et al. | |
| 5,611,476 A | * | 3/1997 | Soderlund et al. | 228/42 |
| 5,993,500 A | | 11/1999 | Bailey et al. | 55/385.6 |
| 6,120,585 A | * | 9/2000 | Inomata et al. | 96/377 |
| 6,146,448 A | * | 11/2000 | Shaw et al. | 95/287 |
| 6,193,774 B1 | * | 2/2001 | Durdag et al. | 55/285.6 |
| 6,354,481 B1 | | 3/2002 | Rich et al. | 228/19 |
| 2001/0055740 A1 | | 12/2001 | Bloom et al. | |

FOREIGN PATENT DOCUMENTS

| | | |
|---|---|---|
| EP | 0 898 443 A1 | 2/1999 |
| EP | 0 999 007 A1 | 5/2000 |

OTHER PUBLICATIONS

International Search Report dated Jun. 24, 2003.

\* cited by examiner

*Primary Examiner*—Ira S. Lazarus
*Assistant Examiner*—Kathryn S. O'Malley
(74) *Attorney, Agent, or Firm*—Mintz, Levin, Cohn, Ferris, Glovsky and Popeo, P.C.

(57) ABSTRACT

Flux management systems and methods are provided for filtering vaporized flux from the gas of a reflow soldering oven. A flux management system includes a cooling chamber having a cooling medium through which the gas passes. The vaporized flux condenses on the surfaces of the cooling chamber and drips into a collection pan, thereby preventing it from dripping onto circuit boards passing through the oven. The flux management system may further include a self-cleaning feature that includes a compressed gas, which is allowed to enter the cooling chamber through a solenoid valve. The compressed gas may then be directed through a heater, which increases the temperature of the cooling chamber, thereby causing a decrease in viscosity of the flux, which allows it to flow freely into a drain tube. The flux may then be transported by gravity into a collection container.

13 Claims, 4 Drawing Sheets

FLUX COLLECTION METHOD AND SYSTEM

FIELD OF THE INVENTION

The present invention is directed generally to reflow soldering ovens and more particularly to reflow soldering oven flux collection systems and methods for removing flux from the oven atmosphere.

BACKGROUND OF THE INVENTION

Reflow soldering ovens are used in the production of printed circuit boards employing surface mount technology. A reflow soldering oven is described in U.S. Pat. No. 5,993,500 entitled "Flux management system," which is herein incorporated by reference. Typically, in a reflow soldering oven the products to be soldered pass through heating zones to a cooling zone. The heating zones are separated into a number of different zones which are generally broken down into preheat zones, soak zones and spike zones. In the preheat zones and the soak zones the products are heated and the flux volatile components vaporize in the surrounding gas atmosphere. The spike zones are hotter than the preheat zones and soak zones, and it is in the spike zones that the solder melts. A reflow solder oven may have many heating zones and these heating zones can be varied depending on the products to be soldered. Different products require different heat profiles and a solder oven should be flexible so that, for example, a machine with ten heating zones may have one preheat zone followed by seven soak zones and two spike zones for one type of circuit board, and a machine may have three preheat zones, six soak zones and one spike zone for a different type of board. The cooling zone or zones follow the heating zones and are used to solidify the solder on the board.

During production, a paste containing solder particles mixed with flux, adhesives, binders, and other components is applied to selected areas of a printed circuit board. Electronic components are pressed against the applied solder paste, while adhesives in the paste hold the components to the printed circuit board. A conveyor belt within a reflow oven carries the printed circuit board and components through a high temperature region within the oven where they are heated to a temperature sufficient to cause the solder particles in the paste to melt. Molten solder wets metal contacts on the components and printed circuit board. The flux in the solder paste reacts with the contacts to remove oxides and to enhance wetting. The conveyor belt moves the heated printed circuit board to a cooling region of the oven where the molten solder solidifies forming a completed electronic circuit.

The reaction of the flux with the contacts liberates vapors. Further, heat within the oven vaporizes un-reacted flux as well as the adhesives, binders, and other components of the solder paste. The vapors from these materials accumulate within the oven leading to a number of problems. If the vapors migrate to the cooling region they can condense on the circuit boards, contaminating the boards and making subsequent cleaning steps necessary. The vapors will also condense on cooler surfaces within the oven, clogging gas orifices, gumming up moving parts, and creating a fire hazard. This condensation may also drip onto circuit boards destroying them, or making subsequent cleaning steps necessary. In addition, condensed vapors may contain corrosive and toxic chemicals which can damage equipment and create a hazard to personnel.

The vapors generated by the reflow operation collectively are referred to herein as "flux vapors." It is understood that the flux vapors can include vaporized flux, vapors from other components of the solder paste, reaction products released when the flux is heated, as well as vapors out-gassed from the printed circuit board and electronic components.

The use of flux management systems for filtering gas containing flux vapors from a reflow oven atmosphere is known. The most common method used for managing flux is condensing the gas containing flux vapors by blowing the gas from the reflow soldering oven across a radiator-type coiled or serpentine heat exchanger external to the oven. The fluid within the heat exchanger is typically room temperature air, chilled water or tap water. This method keeps the cooling fluid separated from the gas. The cleaned gas is returned to the oven.

Another method that is used is to recycle a portion of the gas through a heat exchanger to cool the gas down. The cooled gas is then used to bombard hot gas causing the flux vapors to condense and get trapped in an external filter.

Another method involves passing the gas through a series of external centrifugal blowers. The centrifugal force exerted on gas particles such as vaporized flux causes them to be forced radially outward and condense and drop out when they collide with an outer wall.

Finally, another method passes the gas through an external container with an oil bath and an assortment of filtration medium, which condenses and collects flux particles and returns the filtered gas back to the oven.

Each of these methods suffers from certain problems. Flux gases can contain a mixture of many components with a range of condensation temperatures, viscosities, and degrees of crystallization or polymerization, which can make it difficult to effectively solidify the components. Further, the mixture of flux gas components can vary depending on what type of solder paste is used for a particular assembly.

Cleaning of a heat exchanger is difficult given the nature of condensed flux vapors. Condensed flux vapors are generally not water-soluble so that a solvent is required to remove them. Many solvents are toxic and/or flammable, presenting a safety hazard to workers. Further, disposal of solvent waste is expensive, particularly when the solvent waste includes a variety of unknown reaction products and other chemicals from the condensed flux vapors.

It is therefore desirable to provide a flux management system that removes flux from the system while preventing or minimizing flux from dripping on the printed product. It is also desirable to provide a flux management system that can be cleaned with little or minimized maintenance downtime for the associated reflow oven.

SUMMARY OF THE INVENTION

In one embodiment of the present invention, a reflow solder oven having a cooling chamber for removing an amount of contaminants from a supply of gas is provided. In this embodiment, the cooling chamber includes an intake port for receiving the supply of gas, a heat exchanger containing a cooling medium in thermal communication with the gas to cool the gas; a collection pan for collecting contaminants formed when the heat exchanger cools the gas; and a drain operatively connected to the collection pan to drain the contaminants.

In another embodiment of the present invention, a filtering apparatus for a reflow oven is provided. The apparatus includes a cooling chamber to cool an amount of gas such that an amount of flux condenses out of the gas, a collection pan for collecting the amount of flux that condenses out of the gas, and a heater in thermal communication with the flux to heat and decrease the viscosity of the flux such that the cooling chamber is cleaned.

In yet another embodiment of the present invention, a filtering apparatus for a reflow oven is provided that includes a chamber for removing an amount of flux and other contaminants from a supply of gas; and self-cleaning means for removing the amount of flux and or other contaminants from the reflow oven.

In still yet another embodiment of the present invention, a method for removing an amount of flux from a supply of gas is provided. The method includes the steps of passing the supply of gas through a cooling chamber, wherein the amount of flux is condensed out of the gas, collecting the amount of condensed flux in a collection container, and introducing a heated supply of gas to interact with the gas and decrease the viscosity thereof.

An advantage of embodiments of the invention include being able to remove contaminants from the reflow oven without having to stop the operation of the oven, which increases the efficiency and maintenance costs of the reflow oven.

BRIEF DESCRIPTION OF THE DRAWINGS

For a better understanding of the present invention, reference is made to the drawings, which are incorporated herein by reference, and in which.

DETAILED DESCRIPTION

Figure 1:
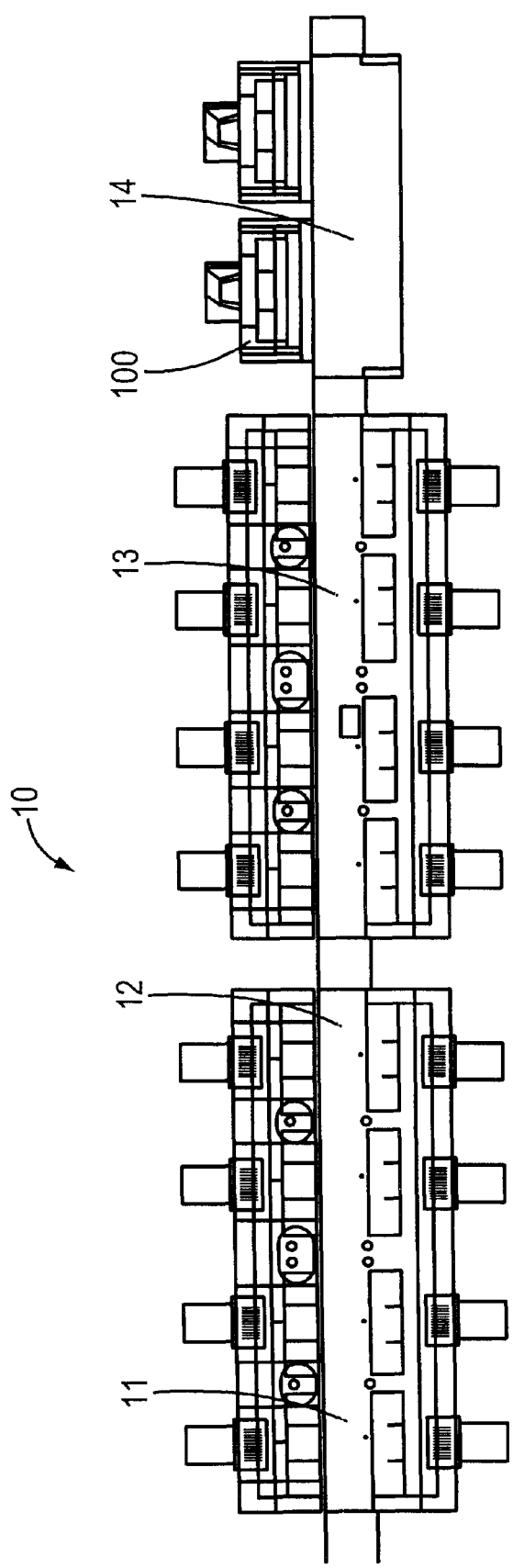
FIG. 1 is a schematic view showing a reflow soldering oven with a flux collection system.

For purpose of illustration, the present invention will now be described with reference to FIG. 1, in which a reflow soldering oven 10 is shown that includes a plurality of heating zones which comprise two preheat zones 11 followed by four soak zones 12 followed by two spike zones 13. Following the spike zones are two cooling zones 14. Incorporated within the first cooling zone 14 is a flux collection system 100.

Figure 2:
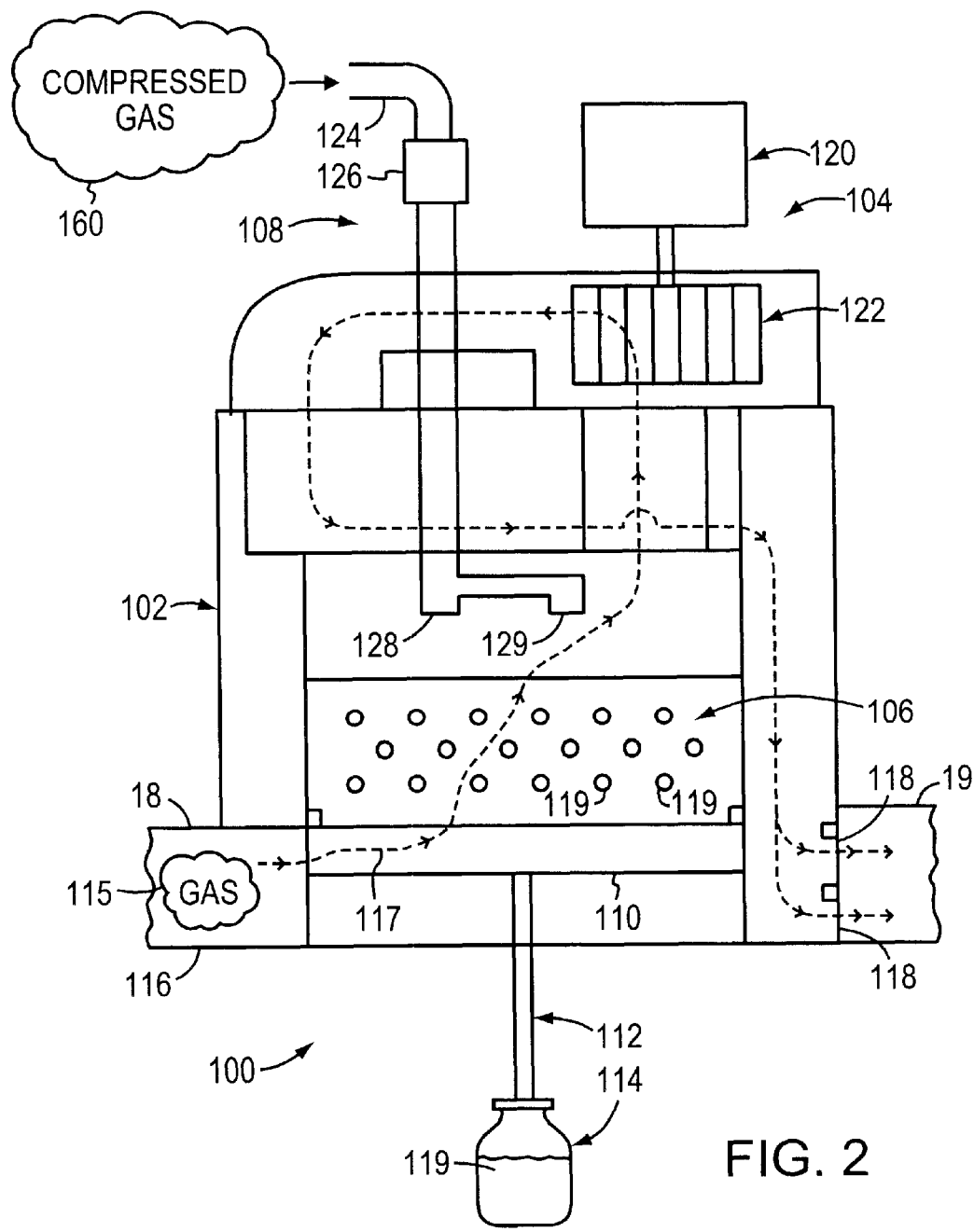
FIG. 2 is a front cross sectional view of the flux collection system of FIG. 1 in accordance with the invention.

FIG. 2 shows an embodiment of the flux collection system 100 shown in FIG. 1. The system 100 includes a cooling chamber 102, a blower system 104, a heat exchanger 106 such as a radiator, a heater assembly 108, a collection pan 110, a drain tube 112 and a collection container 114. The cooling chamber 102 has an inlet port 116 and one or more outlet ports 118. The blower system 104 includes a motor 120 and an impellor 122. The heater assembly 108 includes a incoming gas line 124, a heater 126 and one or more exhausts 128, 129.

Figure 3:
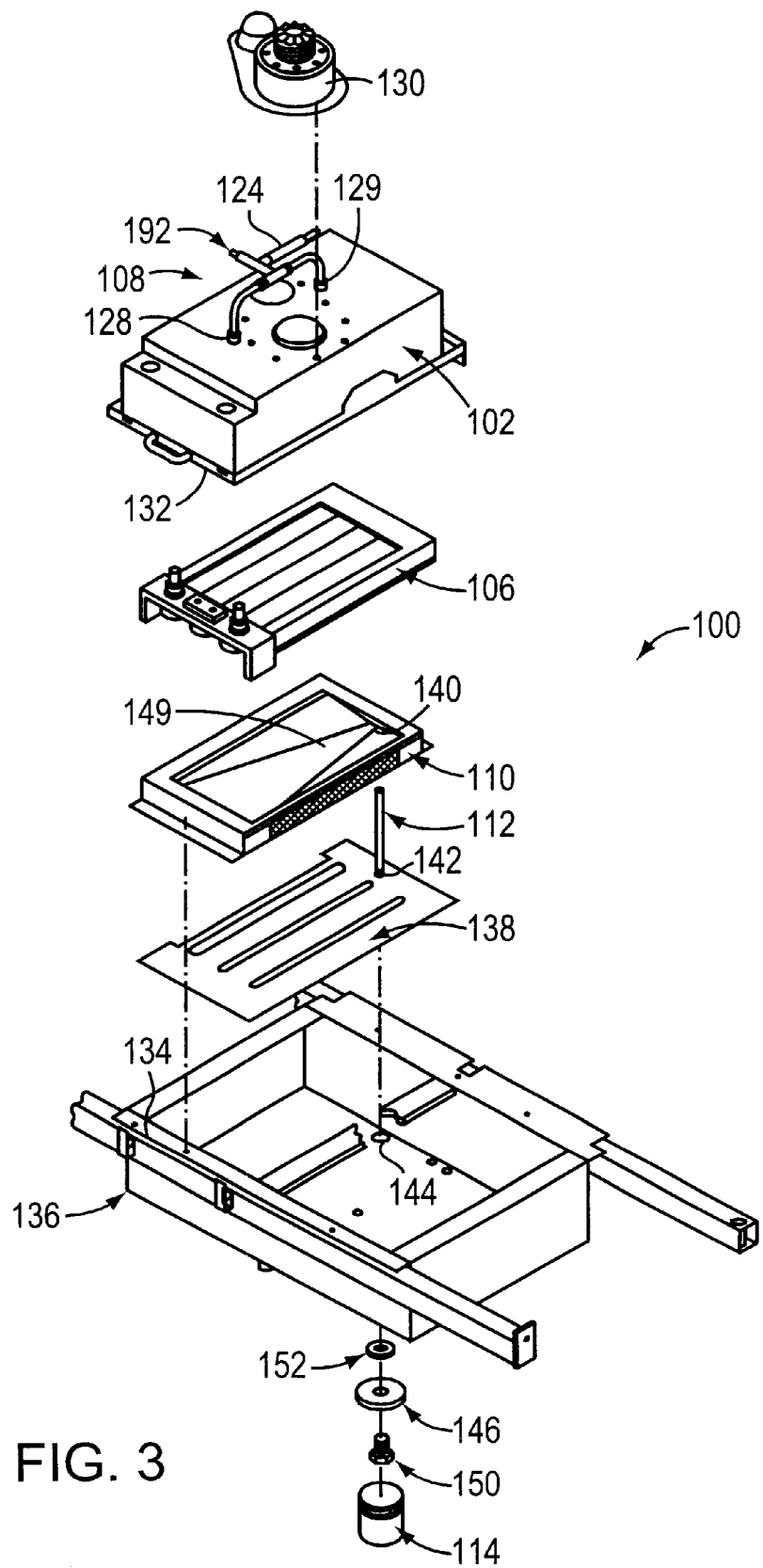
FIG. 3 is a front isometric exploded view of the components of the flux collection system of FIG. 2.

FIG. 3 shows the connections of the self-cleaning flux collection system 100 of FIG. 1 in more detail. The cooling chamber 102 can have connected to its exterior the heater assembly 108 and a housing 130 for the blower system 104. A lower lip 132 of the cooling chamber 102 is connected to a lip 134 of a cooling pan 136. Disposed between the cooling chamber 102 and the cooling pan 136 is the heat exchanger 106, the collection pan 110 and a cooling diffuser plate 138.

The drain tube 112 is connected to an aperture 140 in the collection pan 110 and extends through apertures 142 and 144 in both the cooling diffuser plate 138 and the cooling pan 136, respectively.

The lower end of the drain tube 112 is connected to a lid 146 of a collection container 114. A fitting 150 and silicone O-ring 152 secure the drain tube 112 to the lid 146. The lid 146 preferably screws onto the top of the container 114. The container 114 can be a jar or other flux holding device and can be disposable.

Referring to FIGS. 2 and 3, gas 115, which is from one of the cooling zones 14 of the oven and contains vaporized flux, enters through the inlet 116 and generally moves along line 117 as shown in FIG. 2. The gas 115 may be an inert gas such as nitrogen to reduce oxidation on solder surfaces. The motor 120 and impellor 122 assist in moving the flow of gas along line 117. The gas 115 passes through or near the heat exchanger 106. A cooling medium of the heat exchanger 106 cools the gas 115 such that vaporized flux condenses on the surfaces within the cooling chamber 102. The condensed flux 119 drips into the collection pan 110. The collection pan 110 can be tilted at an angle or have a tilted bottom 149 to allow condensed flux 119 to flow easier along the surface of the collection pan. The condensed flux 119 drips down the drain tube 112 and into collection container 114.

In one embodiment of the present invention, the cooling chamber 102 of the self-cleaning flux collection system is in thermal communication with a heater assembly 108 that periodically increases the temperature of the gasses 115 and the condensed flux 119 in the cooling chamber 102 to increase the viscosity of the flux such that the condensed flux flows easier into the collection pan 110 and down the drain tube 112.

Figure 4:
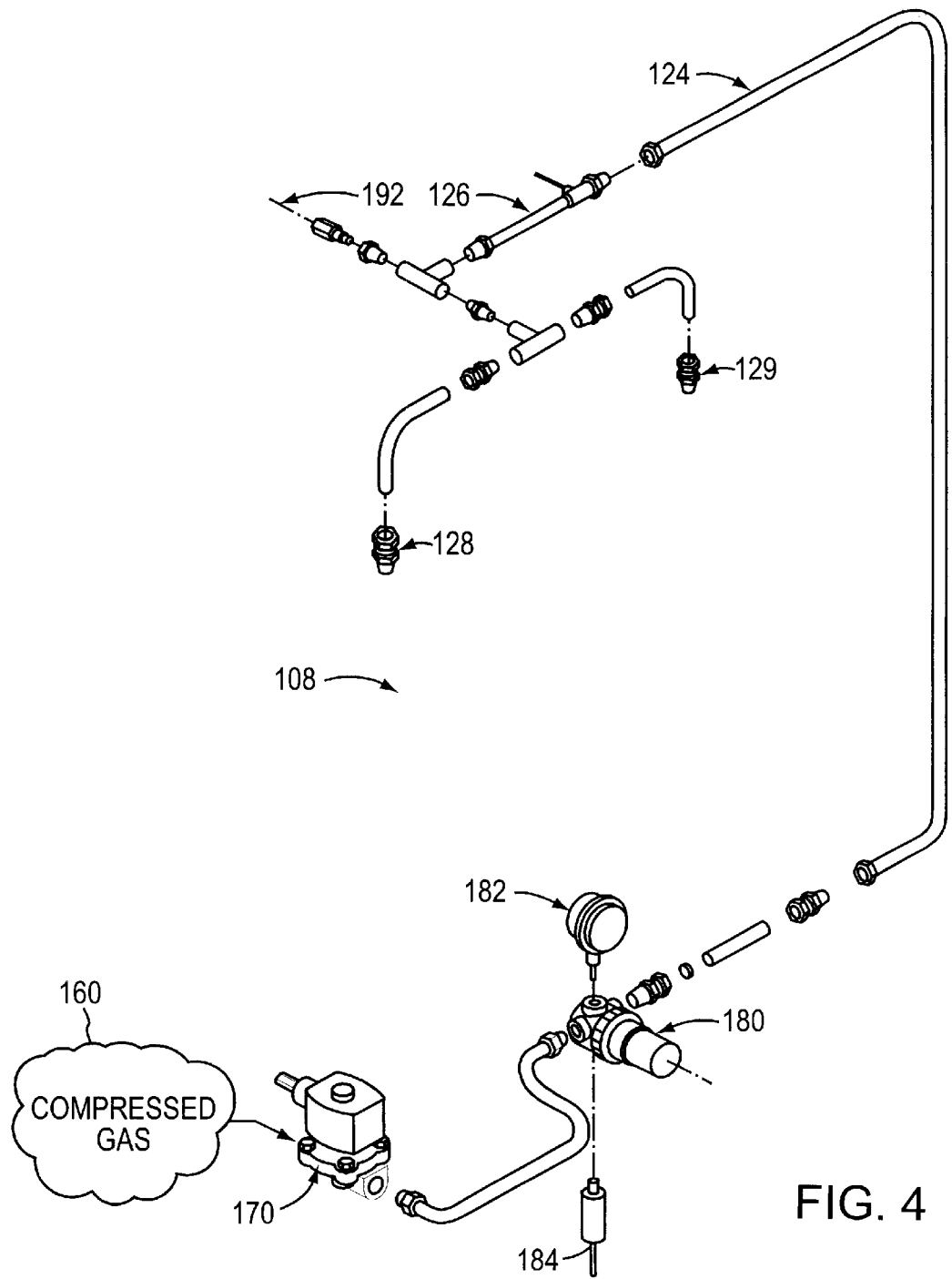
FIG. 4 is a front isometric exploded view of the components of the heater assembly shown in FIG. 3.

FIG. 4 shows the heater assembly 108 in greater detail. The heater assembly 108 includes a solenoid valve 170, a pressure regulator 180, an inline heater 126, a thermocouple 192 and discharge ports 128 and 129.

The heater assembly 108 provides to the cooling chamber 102 a supply of heated and compressed gas, which acts to heat the removed flux and contaminants collected from the gas in cooling chamber 102. Compressed gas 160 enters the heater assembly 108 through a solenoid valve 170. In the preferred embodiment, the compressed gas 160 is nitrogen, however, other compressed gases can be used. The compressed gas 160 exits the solenoid valve 170 and passes through a pressure regulator 180, which includes a pressure gauge 182 and a pressure switch 184. After passing through the pressure regulator 180, the compressed gas 160 is heated by an inline heater 126. The temperature of compressed gas is controlled using a thermocouple 192. The heated and compressed gas enters the cooling chamber 102 through discharge ports 128 and 129.

As the heated compressed gas 160 enters the cooling chamber 102, it interacts with the condensed flux 119 thereby raising its temperature and thus decreasing the viscosity of the flux and other contaminants, causing them to flow into the collection pan 110. The flux that is collected in collection pan 110 is directed via gravity through the drain tube 116 and into the collection container 110.

In one embodiment of the invention, the heater assembly 108 and the heat exchanger 106 operate at different times such that the operation of the heater assembly and the heat exchanger don't interfere with each other. The heater assembly 108 and the heat exchanger 106 can be manually or automatically set to operate in cycles in which only one of the devices is operating at a time. For example, the heat exchanger 106 can be operated at 40–50 degrees Celsius for an eight hour period and the heater assembly can then be operated at between 150 to 275 degrees Celsius for twenty minutes at the end of the eight hour period to remove flux from container 110. In another embodiment of the invention, the heat exchanger 106 can be operated at 200 degrees Celsius for eight hours and the heater assembly 108 can be operated at 275 degrees Celsius for 20 minutes. During the operation of the heater assembly 108, nitrogen can be passed through the heater assembly at 150–300 standard cubic feet-hour (SCFH).

The amount of cooling by heat exchanger 106 and/or the amount of heating by the heater assembly 108 can be controlled by a computer software program to obtain the optimal level of flux condensation and/or condensed flux viscosity. In one embodiment, the software program interface screen has a control section, a status section, a configuration section and a machine state after cleaning cycle section. The control section allows for a manual override of the software to either start or start the flux collection system 100. The status section has readouts that list the status of the cleaning cycle. The configuration section allows the user input of parameters for the heating cycle of the heater assembly 108 such that the user can optimize the effectiveness of the heater assembly.

The software can automatically start the heating cycle of the heater assembly 108 based upon a conveyor run time input that the user specified in the configuration section of the software. To start the heating cycle, water flowing through the heat exchanger 106 is first turned off, the blower is shut off, and compressed gas is turned on in the inline heater. The software controls the heater assembly 108 to run at a user specified start time for a user specified period of time. Once the user specified period of time has elapsed, the flux collection system 100 will either return to the previous state of operation before the heating cycle initiated, or shut down depending on the user selection in the machine state after cleaning cycle section of the software.

Advantages of embodiments of the present invention include a self-cleaning feature that allows the removal of contaminants within the oven without shutting down and opening the oven to clean it, which provides reduced downtime for maintenance and lowers the cost of use.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A reflow solder oven having a cooling chamber for removing an amount of contaminants from a supply of gas, comprising:
   a conveyor to move a printed circuit board through a heating zone, the heating zone producing the amount of contaminants in the supply of gas;
   a cooling chamber, including:
      an intake port for receiving the supply of gas;
      a heat exchanger having a cooling medium in thermal communication with the intake port, the heat exchanger to cool the gas;
      a collection pan located below the heat exchanger to collect contaminants formed when the heat exchanger cools the gas;
      a drain tube operatively connected to the collection pan to drain the contaminants; and
   a heater in thermal communication with the contaminants to heat and decrease the viscosity of the contaminants.

2. A filtering apparatus for a reflow oven, the apparatus comprising:
   a cooling chamber to cool an amount of gas such that an amount of flux condenses out of the gas;
   a collection pan to collect the amount of flux that condenses out of the process gas; and
   a heater in thermal communication with the flux to heat and decrease the viscosity of the flux.

3. The filtering apparatus for a reflow oven of claim 2 further comprising a drain tube operatively connected to the collection pan.

4. The filtering apparatus for a reflow oven of claim 3 further comprising a collection container operatively connected to the drain tube.

5. The filtering apparatus for a reflow oven of claim 2, wherein the cooling chamber includes a heat exchanger to cool the amount of the gas.

6. The filtering apparatus for a reflow oven of claim 5 further comprising a solenoid valve.

7. A method for removing flux from a supply of gas, the method comprising:
   passing the supply of gas through a cooling chamber, wherein an amount of flux is condensed out of the gas;
   collecting the amount of condensed flux in a collection container; and
   introducing a heated supply of gas such that the heated supply of gas interacts with flux condensed out from the gas and decreases the viscosity thereof.

8. The method of claim 7, further comprising collecting flux condensed out from the gas in a collection pan.

9. The method of claim 8, further comprising passing the flux condensed out from the gas and collected in the collection pan through a drain tube and into the collection container.

10. The method of claim 8, further comprising discontinuing supplying process gas through the cooling chamber before introducing a heated supply of gas.

11. A self-cleaning filtering apparatus for removing contaminants from a supply of gas within a reflow oven, the apparatus comprising:
   a cooling chamber, the cooling chamber including:
      a heat exchanger in thermal communication with the gas from the reflow oven to cool the gas and condense the contaminants from the gas;
      a collection pan located below the heat exchanger to collect the contaminants;
      a drain tube operatively connected to the collection pan to drain the contaminants;
      a container operatively connected to the drain tube to contain the contaminants; and
   a heater in thermal communication with the contaminants to heat and decrease the viscosity of the contaminants.

12. The self-cleaning filtering apparatus of claim 11, wherein the contaminants includes condensed flux.

13. The self-cleaning filtering apparatus of claim 12, wherein the heat exchanger is a radiator.

* * * * *

UNITED STATES PATENT AND TRADEMARK OFFICE
CERTIFICATE OF CORRECTION

PATENT NO. : 6,694,637 B2
DATED : February 24, 2004
INVENTOR(S) : Richard W. Miller, Jr. et al.

It is certified that error appears in the above-identified patent and that said Letters Patent is hereby corrected as shown below:

<u>Title page,</u>
Item [75], Inventors, delete "Dautenhalm" and insert -- Dautenhahn --

Signed and Sealed this

Twenty-fifth Day of May, 2004

JON W. DUDAS
*Acting Director of the United States Patent and Trademark Office*